R. WEIR.
CART.
APPLICATION FILED OCT. 25, 1907.
900,455.
Patented Oct. 6, 1908.
2 SHEETS—SHEET 1.
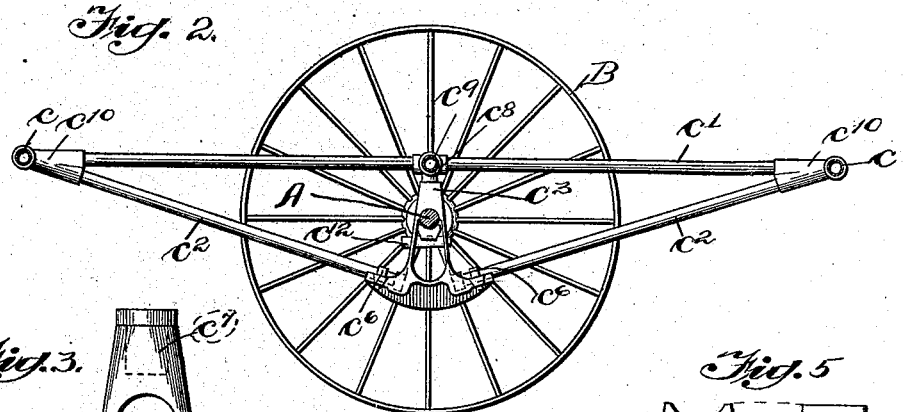
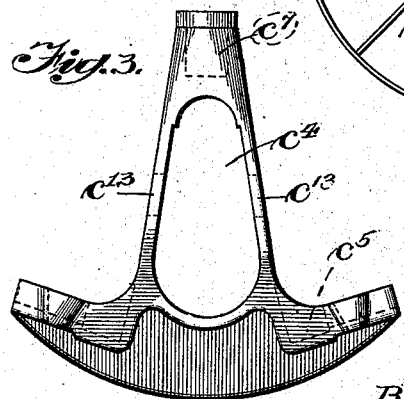
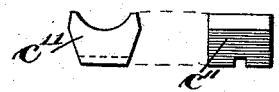
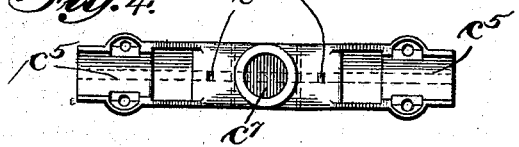
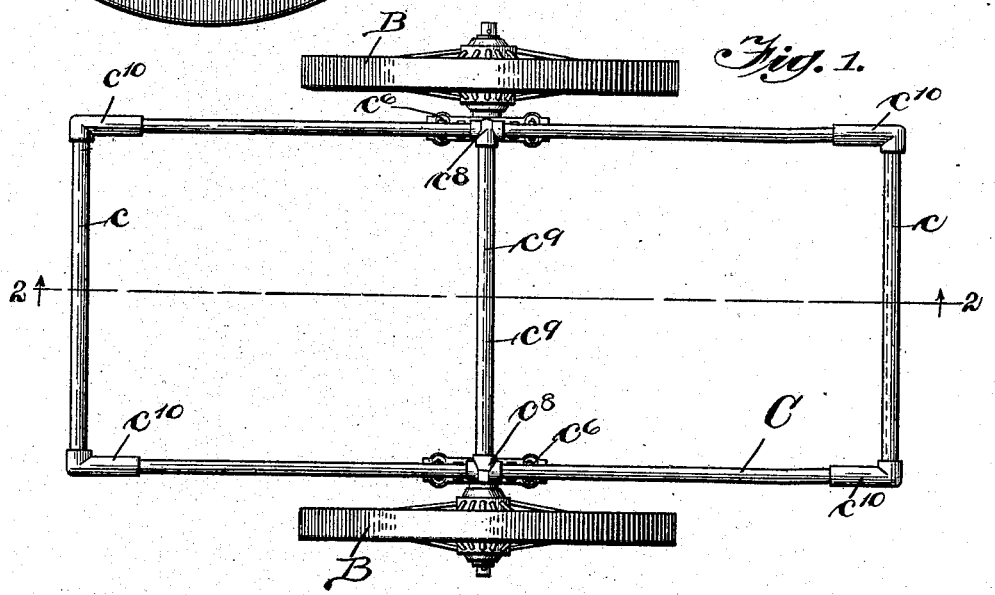

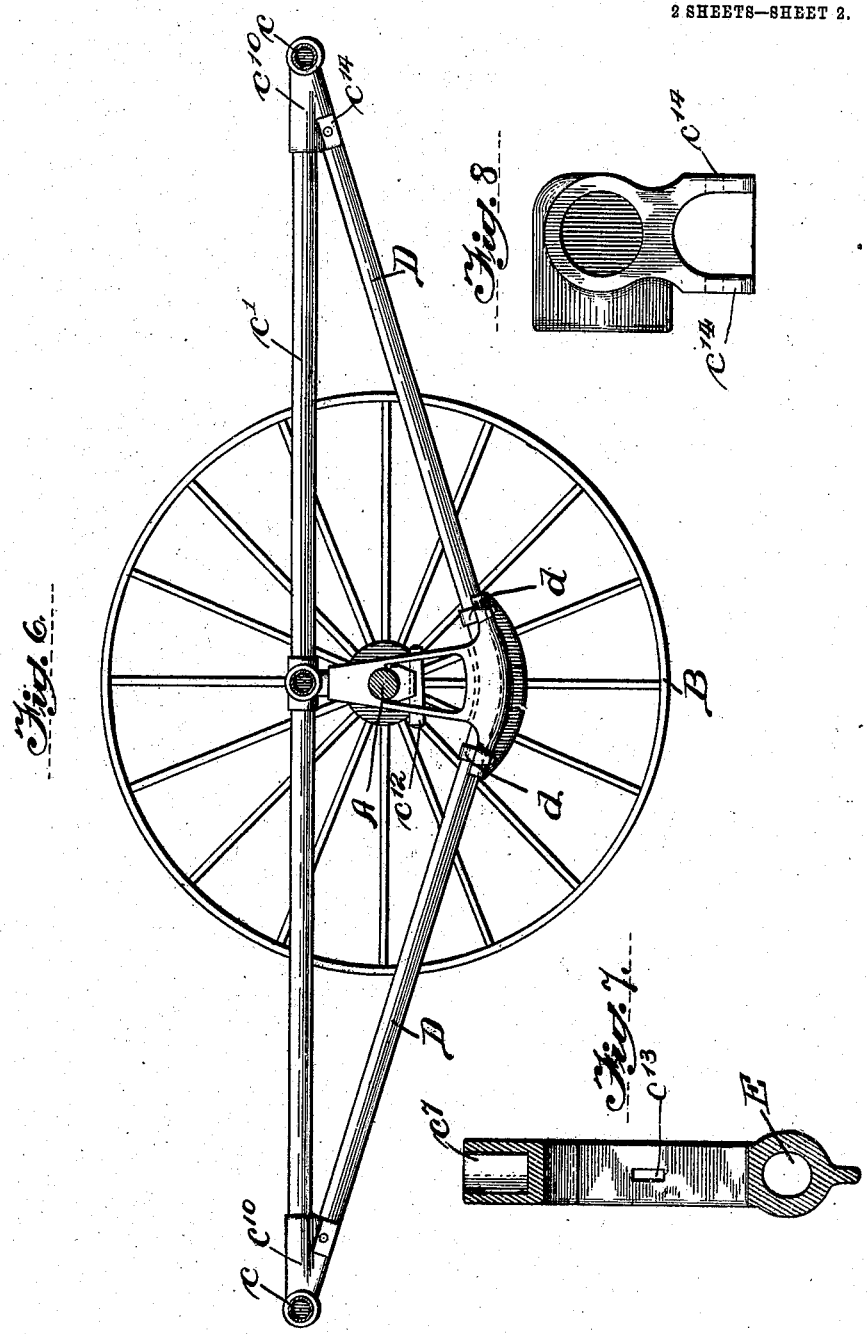

UNITED STATES PATENT OFFICE.

ROBERT WEIR, OF MUSKEGON, MICHIGAN, ASSIGNOR OF ONE-HALF TO PHILIP P. SCHNORBACH, OF MUSKEGON, MICHIGAN.

CART.

No. 900,455.  Specification of Letters Patent.  Patented Oct. 6, 1908.

Application filed October 25, 1907. Serial No. 399,096.

*To all whom it may concern:*

Be it known that I, ROBERT WEIR, a citizen of the United States of America, and resident of Muskegon, Michigan, have invented a certain new and useful Improvement in Carts, of which the following is a specification.

My invention relates to trucks adapted more particularly for use in carting and handling lumber, although they may be used for various purposes.

Generally stated, it is the object of my invention to provide a simple, comparatively cheap and highly efficient construction of truck.

A special object is to provide a construction whereby a pair of trusses may be advantageously employed as the sides of the body-frame.

It is also an object to provide certain details and features of improvement tending to increase the general efficiency and serviceability of a truck of this particular character.

To the foregoing and other useful ends, my invention consists in matters hereinafter set forth and claimed.

In the accompanying drawings, Figure 1 is a plan of a truck embodying the principles of my invention. Fig. 2 is a section on line 2—2 in Fig. 1. Fig. 3 is an enlarged detail view of one of the king-posts. Fig. 4 is a plan of the post shown in Fig. 3. Fig. 5 illustrates one of the bearing blocks for the axle. Fig. 6 is a view similar to Fig. 2, but showing another form of truss. Fig. 7 is a vertical section through the king-post shown in Fig. 6. Fig. 8 is a detail of one of the couplings for connecting the piping of which the trusses may be constructed.

As thus illustrated, my improved truck may comprise an axle A and a pair of vehicle wheels B—B. These wheels and the axle can be of any suitable known and approved construction. The body-frame C is, however, preferably composed of two parallel and oppositely arranged trusses connected at their ends by the cross-bars $c$. Referring to Fig. 2, it will be seen that each truss preferably comprises an upper bar $c^1$, the lower downwardly converging truss-bars $c^2$, and the centrally arranged king-posts $c^3$. All these bars can, if such is desired, be made of suitable piping. The said king-posts, as shown in Figs. 1, 2, 3, and 4, are preferably formed with a central opening $c^4$, and also with recesses $c^5$. With the recess $c^4$, the said king-posts can hang upon the axle A. The recesses $c^5$ are adapted to receive the headed lower ends of the truss-bars $c^2$. Clips $c^6$ can be employed for clamping the lower ends of the truss-bars in place. The top of each king-post can be provided with a socket $c^7$ adapted to receive the bosses on the under sides of the couplings $c^8$. These couplings, it will be observed, connect the side bars $c^1$ with the cross-bar $c^9$. The bars $c$ and $c^1$, and also the outer ends of the truss-bars $c^2$, can be connected by the castings $c^{10}$. In order that the king-posts $c^3$ may not rise from their resting places on the axle, each post can be provided with a bearing block $c^{11}$ adapted to bear upon the underside of the axle, and held in place by a key $c^{12}$. These keys are, it will be observed, inserted through openings $c^{13}$ in the king-posts. Thus constructed, each side of the body frame is, as stated, formed by a king-post truss. The axle, as explained, has a bearing at each side in the two king-posts.

Figs. 6, 7 and 8 show the lower truss-bars D, D formed integral preferably of a single length of pipe and extending through an opening E in the lower part of the king-post. The upper ends of the truss-bars D can be attached to the ears $c^{14}$. With this construction, the strain or thrust on the king-post is all in a downward direction. In the construction shown in Fig. 2, however, it will be seen that there is also a compressive strain on the lower end of each king-post, the two truss-bars $c^2$ tending to bear inwardly toward each other when any weight is thrown upon the body-frame. The frame may be constructed as shown in Fig. 6, or as shown in Fig. 2, as may be desired and in accordance with the condition. If constructed as shown in Fig. 6, it is also desirable to hold the piping or rod forming the two truss-bars D in place by clips $d$. Otherwise the construction shown in Fig. 6 may be substantially the same as shown in Fig. 2. The bars $c^1$ may, if desired, be formed in two sections united by the coupling $c^8$.

From the foregoing, it will be seen that I provide a very simple and comparatively cheap construction of truck, and at the same time I insure the requisite strength and stiffness with practically a minimum weight or amount of material. With the provision of the blocks and keys, the axle can be clamped tightly in the king-posts, so as to prevent it from rotating.

I claim as my invention,—

1. A truck comprising a pair of vehicle wheels connected by an axle, a pair of inverted king-post trusses mounted upon said axle near said wheels, keys and blocks for clamping said axle against turning relatively to said king-posts, and cross-bars for connecting said trusses.

2. A truck comprising a pair of vehicle wheels connected by an axle, a pair of inverted king-post trusses mounted on said axle, said axle passing through openings in said king-posts, keys and blocks for clamping said axle against turning relatively to said king-posts, and cross-bars connecting said trusses, the upper members of said trusses and also the said cross-bars being located in a plane above the said axle, so as to provide a practically flat surface upon which to load lumber or other material.

3. A truck comprising a pair of vehicle wheels, a pair of inverted king-post trusses mounted upon said wheels, the lower compression member of said trusses being provided with upwardly extending flanges adapted to receive the ends of the side rods.

4. A truck comprising a pair of vehicle wheels connected by an axle, a pair of inverted apertured king-post trusses provided with integral bases adapted to receive the lower ends of the truss rods mounted upon said axle, adjacent to said wheels, and cross bars for connecting said trusses.

5. A truck comprising a pair of vehicle wheels connected by an axle, a body frame mounted upon said axle, said body frame being composed of a pair of oppositely disposed parallel apertured king-post trusses provided with integral bases adapted to receive the lower ends of the truss rods arranged adjacent to said wheels, and cross bars for connecting said trusses.

6. A truck comprising a pair of vehicle wheels connected by an axle, a pair of inverted apertured king-post trusses mounted upon said axle adjacent to said wheels, said trusses being provided with integral bases through which continuous truss rods pass, and to which said truss rods are secured, together with cross bars for connecting said trusses.

Signed by me at Muskegon, Michigan, this 19th day of October, 1907.

ROBERT WEIR.

Witnesses:
   R. A. FLEMING,
   WM. LEAHY.